US009088550B1

(12) United States Patent  
Taraki et al.

(10) Patent No.: US 9,088,550 B1  
(45) Date of Patent: Jul. 21, 2015

(54) LOVE LATENCY CONTENT PRESENTATION

(71) Applicant: AMAZON TECHNOLOGIES, INC, Reno, NV (US)

(72) Inventors: Quais Taraki, Bellevue, WA (US); Tapani Juha Otala, San Jose, CA (US); Lei Li, Kirkland, WA (US); Sreeram Raju Chakrovorthy, Campbell, CA (US); Dor Naveh, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 157 days.

(21) Appl. No.: 13/685,252

(22) Filed: Nov. 26, 2012

(51) Int. Cl.
*G06F 7/04* (2006.01)
*H04L 29/06* (2006.01)
*G06F 21/80* (2013.01)
*G06F 21/10* (2013.01)

(52) U.S. Cl.
CPC ............ *H04L 63/0457* (2013.01); *G06F 21/80* (2013.01); *G06F 21/10* (2013.01)

(58) Field of Classification Search
CPC .............. G06F 21/10; H04L 29/06476; H04N 21/23473; H04N 21/23476
USPC ......................................................... 726/26
See application file for complete search history.

(56) References Cited

U.S. PATENT DOCUMENTS

| 7,640,435 | B2 * | 12/2009 | Morten .......................... 713/189 |
| 7,802,277 | B2 * | 9/2010 | Medford .......................... 725/25 |
| 8,280,051 | B2 * | 10/2012 | Malcolm et al. ................ 380/212 |
| 8,700,897 | B2 * | 4/2014 | Peng et al. ...................... 713/165 |
| 2014/0052873 | A1 * | 2/2014 | Watson et al. ................. 709/231 |

\* cited by examiner

*Primary Examiner* — Samson Lemma
(74) *Attorney, Agent, or Firm* — Lindauer Law, PLLC

(57) ABSTRACT

Described herein are systems and methods for initiating presentation of content on a device. Unencrypted content is received for presentation. During presentation of the unencrypted content, encrypted content is accessed, decrypted and prepared for presentation. Once available, the presentation transitions from the unencrypted content to the encrypted content. As a result, latencies involved in accessing the encrypted content do not affect presentation to a user.

24 Claims, 9 Drawing Sheets

LOW LATENCY CONTENT PRESENTATION

BACKGROUND

A wide variety of content is available for download or streaming from content providers. To maintain the rights of the content creators, distributors and others, the content may be protected using one or more digital rights management (DRM) schemes. DRM's protection of the content may encourage content providers to make content available for distribution online. However, implementation of DRM may result in delays to presentation of the content which are apparent to the users. For example, the user may experience about five seconds of initial delay before presentation of DRM-protected content begins. This delay may result in an unacceptable user experience.

Figure 1:
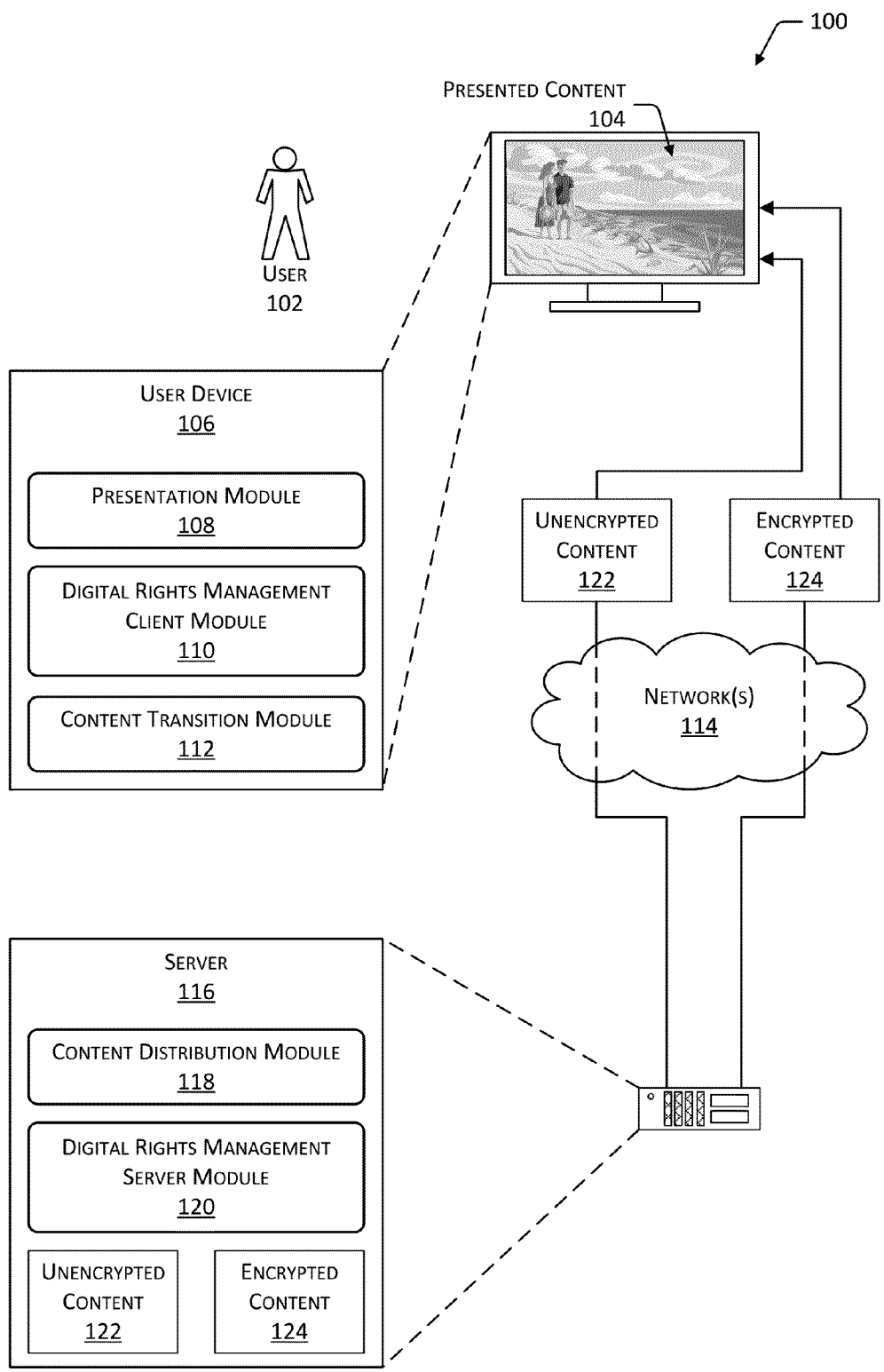
FIG. 1 is an illustrative system for low latency content presentation.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

The collection of content available for users to access continues to grow. This content may include audio books, music, movies, television programming and so forth which may be streamed from a server over a data network such as the Internet to a user device for presentation. The user device may comprise a tablet, smartphone, set-top box, television, in-vehicle entertainment system, game console, portable computer, desktop computer and so forth. Streaming involves the ongoing transfer of data to the user device. This transfer is configured such that presentation may begin while the transfer is taking place.

The content may be protected using digital rights management ("DRM") schemes. The DRM schemes may use encryption, dedicated hardware for decryption and so forth, to control presentation of the content on the user devices. The implementation of DRM tools may encourage content creators and distributors to make the content available online.

After selecting DRM-protected content for presentation, a user may experience a prolonged period of about five seconds during which DRM is configured to allow for presentation of the content. For example, encryption keys may be exchanged, user device hardware codes retrieved and verified, and so forth. Once established, the DRM-protected content may be presented. However, the delay or latency which occurs between the selection and the actual presentation of the content may result in an undesirable user experience.

Described in this disclosure are methods and systems for providing low latency content presentation. Using a user device, the user may select a piece of content for presentation and send a request for that content to a server. The server, based at least in part on the request, sends unencrypted content to the user device for immediate presentation. Because the unencrypted content does not call for DRM controls, presentation on the user device may begin without delay. The unencrypted content may be based at least in part on the content requested. In one implementation, the unencrypted content may comprise an initial portion of the content, such as the beginning thirty seconds of the content.

While the user device receives and presents the unencrypted content, the server is providing second content which comprises the encrypted content which is subject to DRM. The user device is configured in the usual fashion to present the DRM-protected encrypted content. The user device then transitions from presenting the unencrypted content to the encrypted content. This transition may include the discontinuation of the presentation of the first content and beginning the presentation of the second content. The transition may be configured such that the transition is seamless. In some implementations, a transition effect may be applied during the transition from the first content to the second content. These transition effects may include blur, fade, wipe, and so forth.

In some implementations the first content may be encrypted using a protection scheme which is simpler and requires less time to present. For example, the first content may be encrypted using a shared key associated with the particular device. This encryption may be less stringent than that imposed by the DRM, but is able to result in presentation more swiftly than the full DRM interaction requires. Furthermore, due to the limited duration of the first content, potential compromise of this encryption scheme may not be deemed significant.

Using these techniques, during presentation of the content the user does not perceive the latencies involved in presenting DRM-protected content. As a result, the overall user experience is improved.

Illustrative System

FIG. 1 is an illustrative system 100 for low latency content presentation. A user 102 is depicted viewing presented content 104 on a user device 106. While a single user 102 is shown, more than one user may consume content at a given time, such as where multiple users are watching the presented content 104 together. The user device 106 may include a tablet, smartphone, set-top box, television, in-vehicle entertainment system, game console, portable computer, desktop computer and so forth.

The user device 106 may include a presentation module 108 configured to request and present streamed content on one or more output devices. Streaming is an ongoing transfer of data to the user device, the transfer configured such that presentation may begin while the transfer is taking place. The output devices may include a display, a sound system, a haptic output device and so forth. A digital rights management ("DRM") client module 110 is configured to receive and decrypt content which is encoded using one or more DRM schemes. A content transition module 112 is configured to facilitate transition from unencrypted to encrypted content. The user device 106 is discussed below in more detail with regard to FIG. 4.

The user device 106 may couple to one or more networks 114. The one or more networks 114 may include one or more public networks such as the Internet, private networks, or a combination of both, which are configured to transfer data between devices. The network 114 in turn couples to a server 116. While a single server 116 is depicted, in some implementations the server 116 or the functions attributed to the server 116 may be provided by a plurality of devices, such as where the server 116 is a virtualized server executing across a plurality of physical servers.

The server 116 may include a content distribution module 118, a digital rights management server module 120, unencrypted content 122 and encrypted content 124. The content distribution module 118 is configured to provide the unencrypted content 122 and the encrypted content 124 to the user device 106. In some implementations, operation of the content distribution module 118 may be based at least in part on the server 116 receiving a request from the user device 106 to stream a piece of content.

In some implementations the unencrypted content 122 and the encrypted content 124 may be provided by different servers 116. These different servers 116 may be operated by different entities.

The DRM server module 120 is configured to apply one or more DRM schemes to generate the encrypted content 124. In some implementations the encrypted content 124 may be encrypted prior to storage on the server 116, may be encrypted on demand, or may use a combination of both. The server 116 is discussed in more detail below with regard to FIG. 6.

The unencrypted content 122 and the encrypted content 124 may be based at least in part on the same piece of content, or the unencrypted content 122 may be based at least in part on the encrypted content 124. For example, the content may comprise the movie "Burnt Sage," from which the unencrypted content 122 and the encrypted content 124 are generated. The unencrypted content 122 and the encrypted content 124 are thus associated with a common content item.

The unencrypted content 122 is content to which the DRM schemes are not applied. The unencrypted content 122 is configured for presentation on the user device 106 without undue delay or various user device-server interactions. The unencrypted content 122 may be limited in duration, resolution, or both. The unencrypted content 122 may thus have a total overall length or duration which, when presented, is less than the encrypted content 124. For example, the unencrypted content 122 may have a total length of thirty seconds, while the encrypted content 124 has a total length of ninety minutes. In another implementation, the unencrypted content 122 may be at a lower resolution than the encrypted content 124.

The encrypted content 124 comprises content to which the DRM schemes are applied. Presentation of the encrypted content 124 may require device validation, decryption and so forth.

The unencrypted content 122 and the encrypted content 124 may be associated with the same piece of content, or otherwise associated with one another. In one implementation a piece of content may be encrypted to generate the encrypted content 124, while a portion of the piece of content may be used to generate the unencrypted content 122. In another implementation, the encrypted content 124 may be accessed and a portion of the encrypted content 124 may be decrypted to form the unencrypted content 122.

In another implementation, the unencrypted content 122 may be other content associated with the encrypted content 124. For example, the unencrypted content 122 may comprise a studio introduction clip corresponding to the studio which produced the encrypted content 124.

The content distribution module 118 is configured to provide the unencrypted content 122 to the presentation module 108 of the user device 106. The user device 106 proceeds to cause the presentation of the unencrypted content 122. Meanwhile, the DRM client module 110 communicates with the DRM server module 120 to configure the user device 106 to present the encrypted content 124. For example, encryption keys may be exchanged, hardware device identification confirmed and so forth.

The content transition module 112 is configured to work with the presentation module 108 to cause the discontinuation of presentation of the unencrypted content 122 and causing the presentation of the encrypted content 124. To the user 102, the transition may be undetected, or characterized by an increase in the resolution of the presented content 104. Once the transition is complete, the presentation of the encrypted content 124 continues. From the perspective of the user 102, the requested content began presentation quickly, without waiting for a lengthy DRM transaction to be completed.

Figure 2:
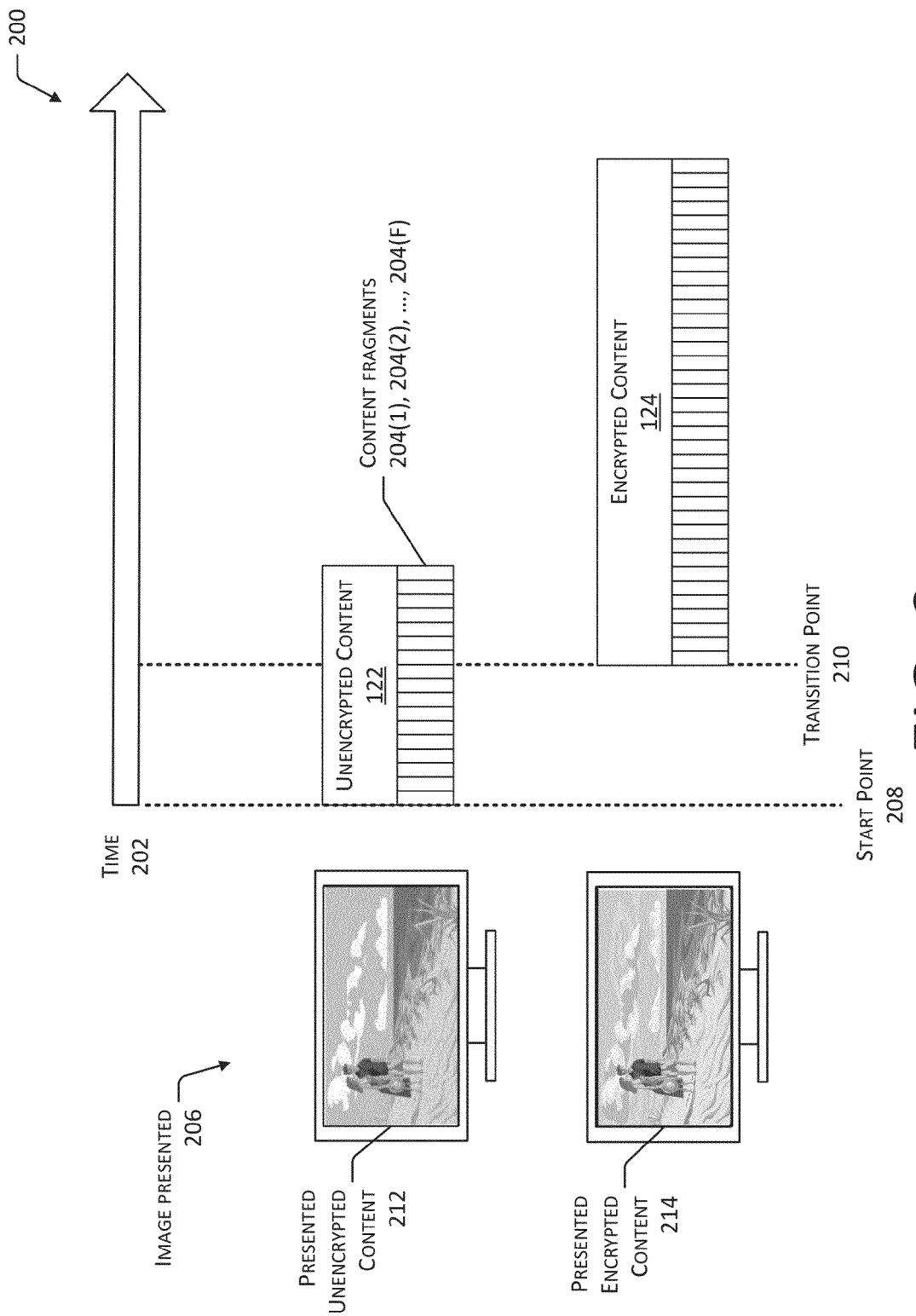
FIG. 2 illustrates a transition from presentation of unencrypted content to encrypted content.

FIG. 2 illustrates a transition 200 from presentation of the unencrypted content 122 to the encrypted content 124. In this illustration, time increases to the right, as indicated by the arrow 202. Depicted is the unencrypted content 122, which comprises one or more content fragments 204(1), 204(2), . . . , 204(F). The fragments 204 may comprise individual frames or groups of frames. In some implementations the fragments 204 may comprise sections of content which are about 2 seconds in duration.

Also shown here is the image presented 206 by the user device 106 at various points. The unencrypted content 122 starts presentation at a start point 208, such as time zero, until a transition point 210. As shown here, presented unencrypted content 212 is presented by the user device 106 until the transition point 210 is reached.

At the transition point 210, the presentation of the user device 106 changes to presented encrypted content 214. The unencrypted content 122, no longer used for presentation, may be discarded or discontinued, while the presented encrypted content 214 continues. In some implementations, the encrypted content 124 as processed by the DRM client module 110 is used to generate the presented encrypted content 214.

The transition point 210 may be configured to allow for a seamless transition between the unencrypted content 122 and the encrypted content 124. For example, the transition point 210 may be configured to occur at a same presentation time occurring in both the unencrypted content 122 and the encrypted content 124. For example, the transition point 210 may take place at an elapsed presentation time of six seconds into the content.

The transition point 210 may be predetermined and statically set. For example, a system engineer may determine that DRM configuration will be complete for presentation within five seconds and the transition point 210 may be set at six seconds to provide for additional variance. In another implementation, the transition point 210 may be determined based at least in part on the availability of the encrypted content 124 for presentation. For example, the transition point 210 may be based at least in part on when the encrypted content 124 is available for presentation, such that the transition point 210 may vary, such as from three seconds to fifteen seconds.

Figure 3:
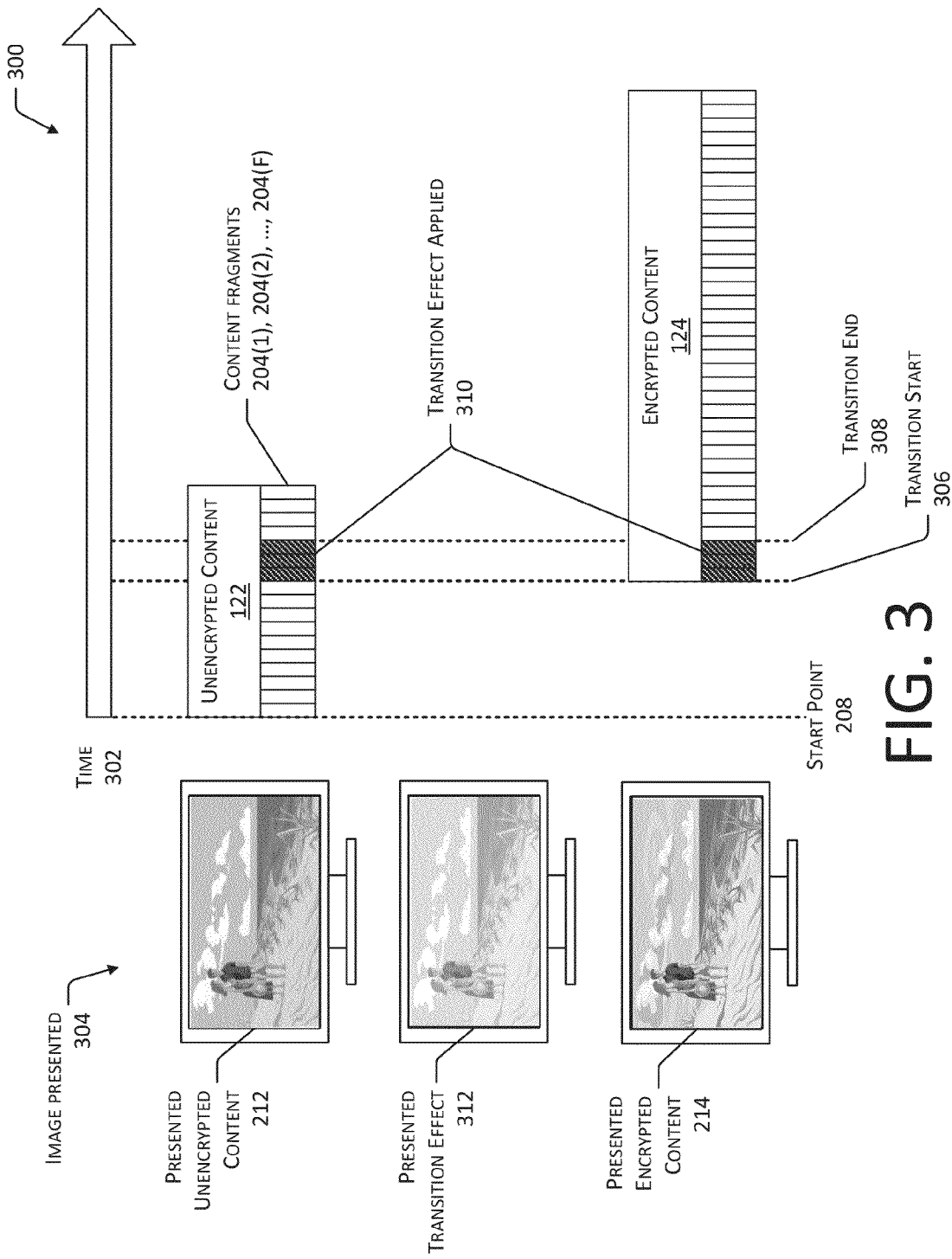
FIG. 3 illustrates a transition during presentation from unencrypted content to transition content then to encrypted content.

FIG. 3 illustrates a transition 300 during presentation from unencrypted content 122 to the encrypted content 124 using a transition effect. As above, in this illustration time increases to the right, as indicated by the arrow 302. Depicted is the unencrypted content 122, which comprises one or more content fragments 204(1), 204(2), . . . , 204(F). Also depicted is an image presented 304 by the user device 106.

As shown here, the unencrypted content 122 starts presentation at the start point 208, such as time zero. As shown here, the presented unencrypted content 212 is shown by the user device 106 until a transition start 306.

From the transition start 306 until the transition end 308, one or more transition effects may be applied 310 to the unencrypted content 122, the encrypted content 124, or both. The transition effects may include blur, fade, wipe and so forth and are discussed below in more detail with regard to FIG. 5. The application of the transition effect may minimize the user's 102 perception of an abrupt and potentially disquieting change. In another implementation, transition content may be inserted and presented between the unencrypted content 122 and the encrypted content 124.

In this illustration the transition start 306 and the transition end 308 are depicted as occurring within the time when content fragments 204 for the unencrypted content 122 are available. During this time from the transition start 306 and the transition end 308 a presented transition effect 312 is presented by the user device 106. In some implementations the unencrypted content 122 may cease and the encrypted content 124 may be presented, such that there is no overlap between the unencrypted content 122 and the encrypted content 124.

The transition from the unencrypted content 122 to the encrypted content 124 may be synchronized such that the transition point 210 or the transition start 306 and the transition end 308 correspond to the same presentation time in the unencrypted content 122 and the encrypted content 124. For example, the transition start 306 may begin at time 0:04 in the unencrypted content 122 and in the encrypted content 124.

In some implementations, such as where the transition point 210 or the transition start 306 and the transition end 308 are pre-determined, the encrypted content 124 may be configured to begin presentation at that point. For example, the transition point 210 may be predetermined to be at six seconds. As a result, the encrypted content 124 may be configured to be delivered for presentation at a presentation time of six seconds. The encrypted content 124 may be ready to begin presentation at that particular time and the unencrypted content 122 may be transitioned to the encrypted content 124 at that five second mark.

Figure 4:
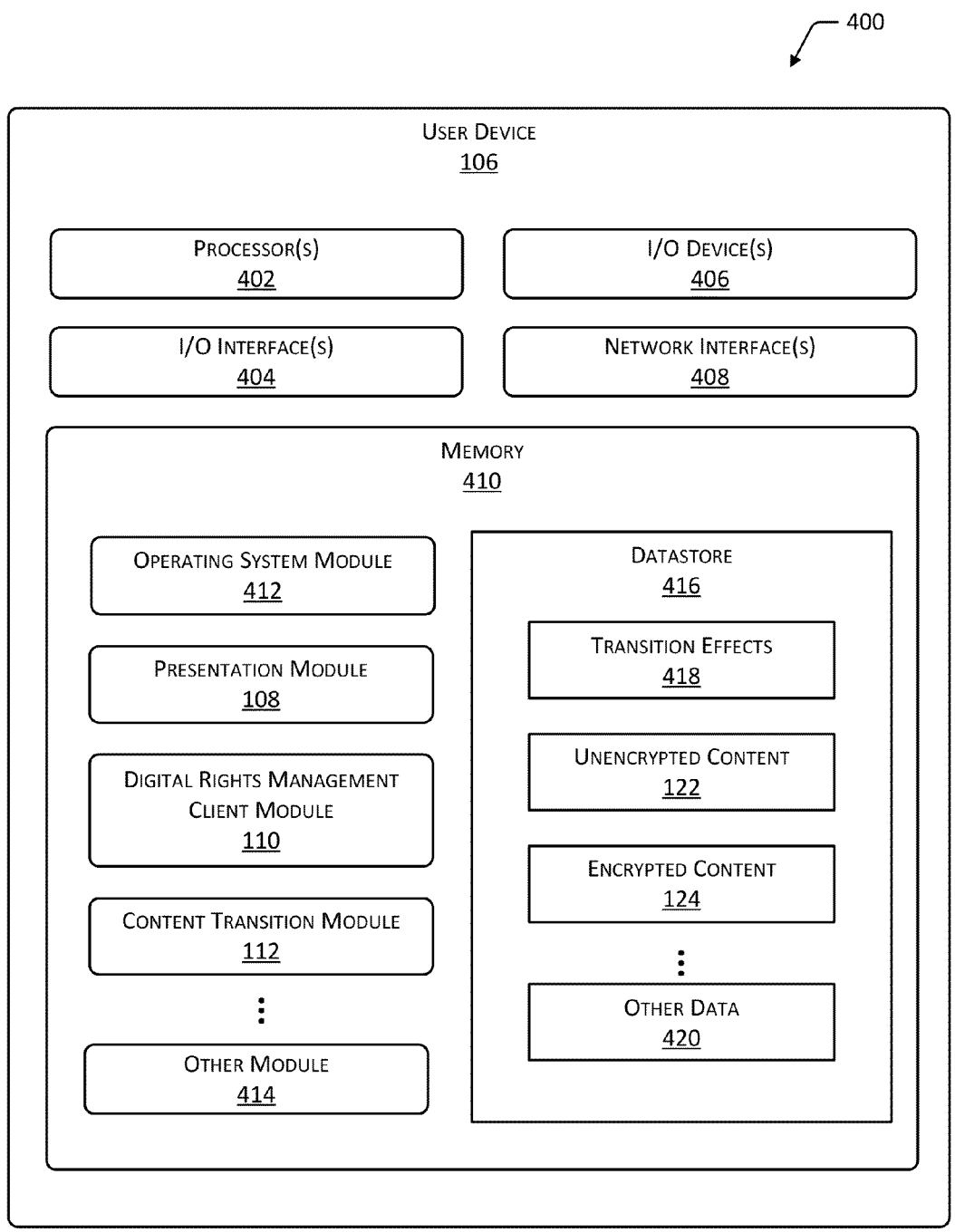
FIG. 4 illustrates a block diagram of a user device configured to support low latency content presentation.

FIG. 4 illustrates a block diagram 400 of the user device 106 configured to support low latency content presentation. The user device 106 may include one or more processors 402 configured to execute one or more stored instructions. The processors 402 may comprise one or more cores. The user device 106 may include one or more input/output ("I/O") interface(s) 404 to allow the user device 106 to communicate with other devices. The I/O interfaces 404 may comprise inter-integrated circuit ("I2C"), serial peripheral interface bus ("SPI"), universal serial bus ("USB"), RS-232, media device interface, and so forth. The media device interface may be a High Definition Multimedia Interface ("HDMI") as promulgated by HDMI Licensing LLC, TOSLINK as promulgated by Toshiba Corp., Ethernet, analog video, analog audio, IEEE 1394 as promulgated by the Institute for Electrical and Electronics Engineers, Universal Serial Bus as promulgated by the USB Implementers Forum, Digital Visual Interface ("DVI") as promulgated by the Digital Display Working Group, video graphics array ("VGA"), DisplayPort as promulgated by the Video Electronics Standards Association ("VESA"), Intel Wireless Display ("Wi-Di"), Wi-Fi Direct, Bluetooth as promulgated by the Bluetooth Special Interest Group, ZigBee as promulgated by the ZigBee Alliance, and so forth.

The I/O interface(s) 404 may couple to one or more I/O devices 406. The I/O device(s) 406 may include user input devices such as one or more of a keyboard, a mouse, a game controller, a touch input device, gestural input device, accelerometers, microphones and so forth. The I/O devices 406 may include output devices such as one or more of a display, a printer, audio speakers, haptic output device and so forth. In some embodiments, the I/O devices 406 may be physically incorporated with the user device 106 or may be externally placed.

The user device 106 may also include one or more network interfaces 408 configured to provide communications between the user device 106 and other networked devices. Such network interface(s) 408 may include one or more network interface controllers ("NICs") or other types of transceiver devices configured to send and receive communications over the network 114. The user device 106 may also include one or more busses or other internal communications hardware or software that allow for the transfer of data between the various modules and components of the user device 106.

As shown in FIG. 4, the user device 106 includes one or more memories 410. The memory 410 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 410 provides storage of computer readable instructions, data structures, program modules and other data for the operation of the user device 106.

The memory 410 may include at least one operating system (OS) module 412. The OS module 412 is configured to manage hardware resources such as the I/O interfaces 404 and provide various services to applications or modules executing on the processors 402. Also stored in the memory 410 may be the presentation module 108, the DRM client module 110, the content transition module 112 and other modules 414.

As described above, the presentation module 108 is configured to request and present content on one or more output devices coupled to the user device 106. In some implementations the presentation module 108 may execute as multiple threads on the one or more processors 402. For example, a first thread may be configured to cause presentation of the unencrypted content 122 while a second thread is configured to cause presentation of the encrypted content 124. The presentation module 108 may be configured to present content which is streamed to the user device 106 from the server 116, locally stored in the memory 410, or both. The presentation module 108 may work in conjunction with the DRM client module 110 and the content transition module 112 to present unencrypted content 122 until the encrypted content 124 is available for presentation. The content transition module 112 described below may coordinate the change in presentation from the unencrypted content 122 to the encrypted content 124.

The DRM client module 110 is configured to receive and decrypt the encrypted content 124 which is encoded and otherwise protected using one or more DRM schemes. The DRM client module 110 may access one or more pieces of dedicated DRM hardware which are incorporated into the user device 106, such as a hardware decryption circuitry coupled to the processor 402. The DRM client module 110 may send information to the server 116 indicative of the particular identity of the user device 106 and otherwise interact with the server 116 to establish an exchange of information and presentation of that information which is protected by the DRM scheme. The DRM client module 110 may be configured to decrypt the encrypted content 124 such that it may be processed by the presentation module 108 for output. As described above, the setup and verification of the DRM associated with the encrypted content 124 may take some time to complete. In some implementations, the DRM interchange may take about five seconds to complete from initial request to availability of decrypted content from the encrypted content 124.

The content transition module 112 may also be stored in the memory 410 of the user device 106. The content transition module 112 is configured to facilitate transition from unencrypted content 122 to encrypted content 124. The content transition module 112 may be configured to use a static or predetermined transition point 210 such as described above with regard to FIG. 2. For example, the transition point 210 may be specified at five seconds. In another implementation, the transition point 210 may be determined dynamically, such as relative to the availability of encrypted content 124 for presentation. For example, the transition point 210 may vary such that when the DRM scheme is implemented more quickly such as at four seconds or more slowly at seven seconds, the transition point 210 corresponds to four or seven seconds. The transition point 210 may be specified globally, for particular groups of content, may be varied according to content provider, or be specified for individual pieces of content. For example, the transition point 210 for television programs may be static at five seconds while the transition point 210 for movies may be static at seven seconds.

As described above with regard to FIG. 3, in some implementations the content transition module 112 may apply a transition effect to a portion of the unencrypted content 122, the encrypted content 124, or both. For example, the content transition module 112 may apply a "dissolve" transition effect at the point where the presentation of the unencrypted content 122 gives way to the presentation of the encrypted content 124.

Other modules 414 may be stored in the memory 410. For example, a user interface module may be configured to provide a user interface to the user 102 and accept inputs responsive to that user interface.

The memory 410 may also include a datastore 416 to store information. The datastore 416 may use a flat file, database, linked list, tree, or other data structure to store the information. In some implementations, the datastore 416 or a portion of the datastore 416 may be distributed across one or more other devices including servers, network attached storage devices and so forth.

The datastore 416 may store information about one or more transition effects 418. The transition effects 418 may include instructions which, when executed by the processor 402, modify the presentation of content. The transition effects 418 are discussed in more detail below with regard to FIG. 5.

The datastore 416 may also store the unencrypted content 122 or a portion thereof, the encrypted content 124 or a portion thereof, or both. In some implementations the content for presentation may be stored locally, such as in the datastore 416. However, that locally stored content may still require establishment of a DRM session to allow for presentation of the content. For example, the user 102 may have downloaded using the network interface 408 a movie to the local device, but that movie may have been delivered as encrypted content 124 subject to a DRM scheme.

The unencrypted content 122, as described above is associated with the encrypted content 124. For example, the unencrypted content 122 and the encrypted content 124 may be for the same content item. Content items include particular titles, Identification numbers, and so forth. As described above, the unencrypted content 122 is of a shorter duration than the encrypted content 124. In one implementation the unencrypted content 122 may comprise the initial ten seconds, or other predetermined interval, of presentation of content. The unencrypted content 122 and the encrypted content 124 may encode information at different resolutions or fidelity. For example, the unencrypted content 122 may be encoded at standard definition 480p while the encrypted content 124 is encoded at high definition 1080p.

Other data 420 may be stored in the datastore 416. For example, user preferences as to transition effects, account access information for the DRM client module 110 and so forth.

Figure 5:
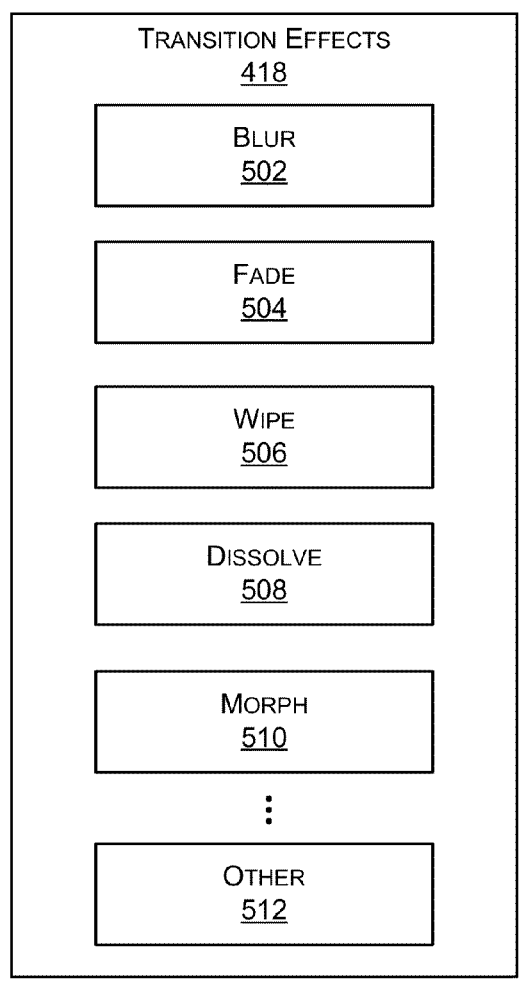
FIG. 5 illustrates a block diagram of transition effects which may be used to transition from the unencrypted content to the encrypted content.

FIG. 5 illustrates a block diagram 500 of the transition effects 418 which may be used to transition from the unencrypted content 122 to the encrypted content 124. The content transition module 112 may segue from the unencrypted content 122 to the encrypted content 124 without applying the transition effect 418. However, in some implementations application of the transition effect 418 may improve the user experience by mitigating what may be an otherwise abrupt transition, such as from a lower resolution to a higher one. As described above with regard to FIGS. 3 and 4, the transition effects 418 may be applied to presented content 104 from a transition start 306 to a transition end 308 time.

The transition effects 418 may include instructions which, when executed by the processor 402, modify the presentation of content. This may be unencrypted content 122, encrypted content 124, or both. The transition effects 418 may be expressed as instructions or algorithms which modify the data for presentation. The transition effects 418 may be applied to audio, video, or both. For convenience and not by way of limitation, the following transition effects 418 are described with respect to visual content such as video or still images.

A blur transition effect 502 may be provided which introduces a slight blurring to the presented content 104 before removing the blur. A fade 504 effect may gradually modify the image such that it starts or ends with a particular color such as black or white. A wipe 506 effect replaces one image with another traveling from one side of a frame to another. A dissolve 508 effect gradually changes from one image to another over time. A morph 510 may be used to reshape or readjust objects from one image to another. Other effects 512 may also be used as well.

As described above, the content transition module 112 may use the transition effects 418 to change from presenting the unencrypted content 122 to the encrypted content 124. The transition effect 418 may be applied to a portion of the unencrypted content 122, the encrypted content 124, or both.

Figure 6:
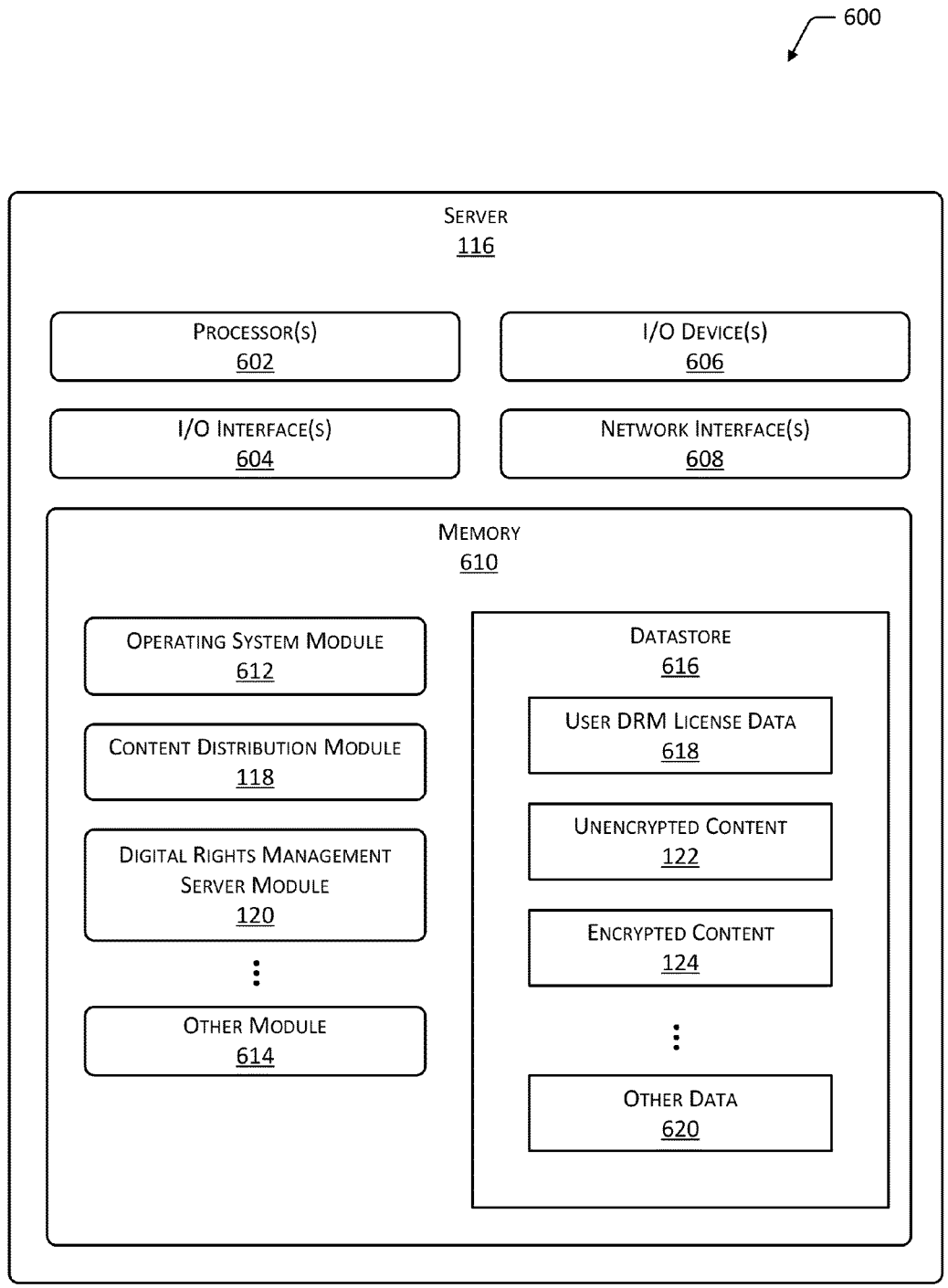
FIG. 6 illustrates a block diagram of a server configured to support low latency content presentation.

FIG. 6 illustrates a block diagram 600 of the server 116 configured to support low latency content presentation. The server 116 may include one or more processors 602 configured to execute one or more stored instructions. The processors 602 may comprise one or more cores. The server 116 may include one or more I/O interface(s) 604 to allow the server 116 to communicate with other devices. The I/O interfaces 604 may comprise I2C, SPI, USB, RS-232 and so forth.

The I/O interface(s) 604 may couple to one or more I/O devices 606. The I/O device(s) 606 may include user input devices such as one or more of a keyboard, a mouse and so forth. The I/O devices 606 may include output devices such as one or more of a display, a printer and so forth. In some embodiments, the I/O devices 606 may be physically incorporated with the server 116 or may be externally placed.

The server 116 may include one or more network interfaces 608 configured to provide communications between the server 116 and other networked devices. Such network interface(s) 608 may include one or more NICs or other types of transceiver devices configured to send and receive communications over the network 114. The server 116 may also include one or more busses or other internal communications hardware or software that allow for the transfer of data between the various modules and components of the server 116.

As shown in FIG. 6, the server 116 includes one or more memories 610. The memory 610 comprises one or more CRSM, such as described above. The memory 610 provides storage of computer readable instructions, data structures, program modules and other data for the operation of the server 116.

The memory 610 may include at least one operating system (OS) module 612. The OS module 612 is configured to manage hardware resources such as the I/O interfaces 604 and provide various services to applications or modules executing on the processors 602. Also stored in the memory 610 may be the content distribution module 118, the DRM server module 120 and other modules 614.

The content distribution module 118 is configured to provide content to the user device 106. The content distribution module 118 may receive a request or "pull" from the user device 106, or may be configured to "push" content to the user device 106. The content distribution module 118 may provide the unencrypted content 122, the encrypted content 124, or both to the user device 106. The content distribution module 118 may be configured to determine the unencrypted content 122 which is associated with the encrypted content 124. For example, the user device 106 may request the movie content "Burnt Sage." The content distribution module 118, receiving this request, may determine that the unencrypted content 122 of the first ten seconds of "Burnt Sage" is available, as well as the entire movie "Burnt Sage" as encrypted content 124 subject to a DRM scheme. The content distribution module 118 may provide the unencrypted content 122 to the user device 106, providing the user device 106 with content to begin presenting as soon as possible, while the DRM interchange with the user device 106 is completed. The content distribution module 118 may then provide the encrypted content 124. In some implementations, the content distribution module 118 may send the encrypted content 124 while also sending the unencrypted content 122 contemporaneously.

The transmission of the encrypted content 124 in some implementations may be based at least in part on receiving data from the user device 106. For example, this data may indicate that the user device 106 is ready to receive and present the encrypted content 124. In yet another implementation, the DRM server module 120 may pass data to the content distribution module 118 indicating that the DRM session is established with the user device 106.

The DRM server module 120 is configured to support one or more DRM schemes for the distribution and presentation of content. The DRM server module 120 may be configured to apply one or more DRM schemes to generate the encrypted content 124, or may be configured to apply the one or more DRM schemes to allow for access to previously encrypted content 124. The DRM server module 120 may be configured to work in conjunction with other elements of a DRM architecture, such as additional servers 116 configured to authenticate DRM credentials.

Other modules 614 may be stored in the memory 610. For example, an accounting module may track usage of the content and generate billing.

The memory 610 may also include a datastore 616 to store information. The datastore 616 may use a flat file, database, linked list, tree, or other data structure to store the information. In some implementations, the datastore 616 or a portion of the datastore 616 may be distributed across one or more other devices including other servers, network attached storage devices and so forth.

The datastore 616 may store user DRM license data 618. The user DRM license data 618 may indicate particular user accounts or user devices 106 which are permitted particular access to the encrypted content 124.

The datastore 616 may also store the unencrypted content 122 or a portion thereof, the encrypted content 124 or a portion thereof, or both. In some implementations source content which is a full length version of the content may be stored. This source content may be encrypted by the DRM server module 120 prior to distribution as encrypted content 124 to the user device 106.

In one implementation, the DRM server module 120 may work in conjunction with the content distribution module 118 to generate the unencrypted content 122 from the encrypted content 124. For example, newly received full length encrypted content 124 for a particular content item may be received by the server 116. The DRM server module 120 may be used to decrypt the first ten seconds of the encrypted content 124 and generate ten seconds of unencrypted content 122. In one implementation the unencrypted content 122 may be stored for later transmission to the user device 106.

In another implementation, the DRM server module 120 may be configured to decrypt on demand and produce the unencrypted content 122 to the user device 106. This implementation may be used when the DRM server module 120 is configured to establish the necessary DRM permissions and generate the decrypted content for delivery as the unencrypted content 122 more quickly than the user device 106 is able to establish the DRM session for presentation. For example, the DRM server module 120 may take less than one second to verify DRM permissions and begin streaming unencrypted content 122 to the user device 106, compared to the five seconds for the user device 106 itself to establish the DRM permissions and begin presentation.

Illustrative Processes

Figure 7:
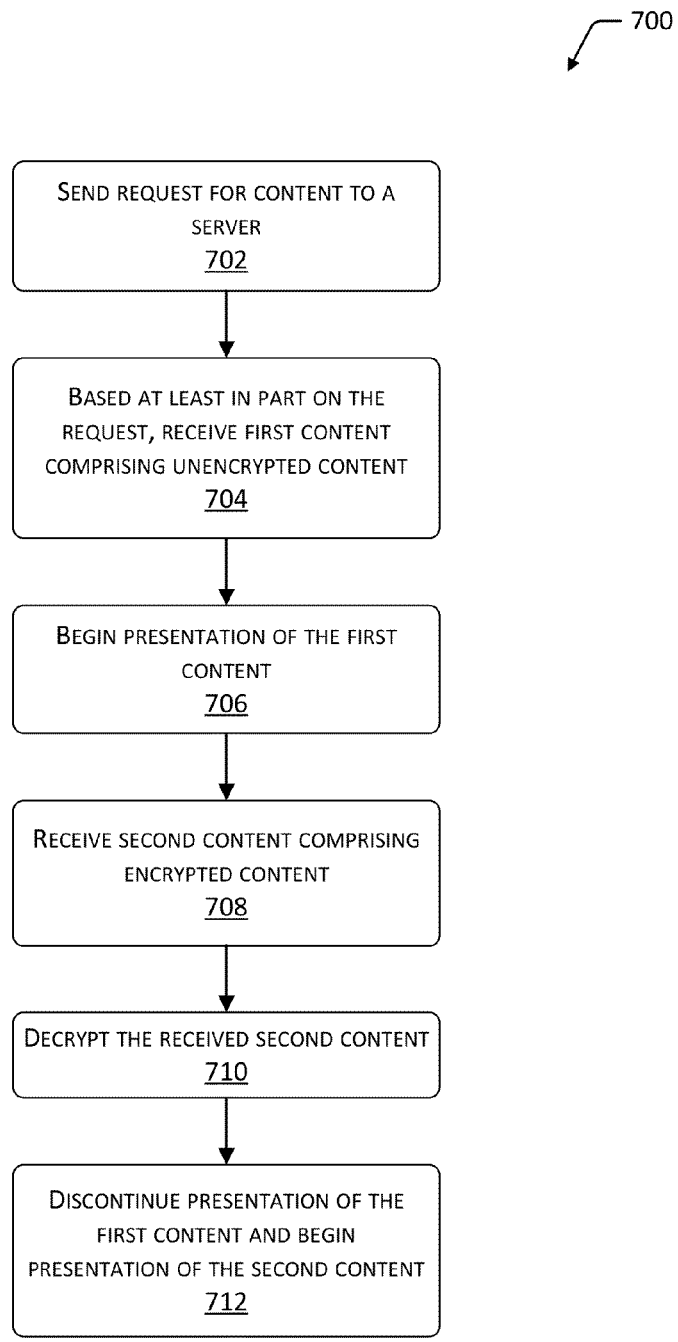
FIG. 7 is a flow diagram of a process of low latency content presentation from the user device point of view.

FIG. 7 is a flow diagram 700 of a process of low latency content presentation from the user device 106 point of view. This process may be implemented by the user device 106.

Block 702 sends, to a server 116, a request for a piece of content. This request may be for the content to be streamed to the user device 106 and is configured to specify the piece of content for streaming. In some implementations the request may omit the specification of the piece of content, allowing for the server 116 or another device to specify the content which is to be presented. For example, the user 102 may initiate a "random watch" function which allows the server 116 to select the piece of content for presentation.

Block 704, based at least in part on the request, receives first content from the server 116. The first content may comprise the unencrypted content 122 based at least in part on the piece of content. For example, the content requested may have been the movie "Burnt Sage" and the unencrypted content 122 may comprise the first ten seconds of that movie.

In another implementation, the first content may be associated with the requested content. For example, the first content may comprise a studio introduction clip for the studio or distribution company of the requested content. Several pieces of content may be associated with the same studio introduction clip, such as various movies made by the same studio. Requests for content associated with the studio may receive first content comprising the studio introduction clip. The same piece of first content may thus be provided to fulfill requests for content which is from that studio or distribution company. Such commonality in the data may be used to reduce the storage requirements of the first content on the server 116.

In some implementations, the first content provided by the server 116 may be encrypted using techniques which allow for faster presentation compared to the DRM schemes implemented by the DRM modules. For example, the first content may be encrypted using a simple preshared key. Use of the simple preshared key provides some protection of the content, while facilitating rapid presentation. This minimally or simply encrypted content, which is quickly available for presentation, thus may be used to provide the initial presentation, until the fully DRM-protected encrypted content 124 is available for presentation.

Block 706 causes or otherwise begins presentation of the first content on a display device. For example, the processor 402 may send the unencrypted content 122 as processed by the presentation module 108 to the media device interface coupled to the display device. In some implementations the presentation of the second content is synchronized with the presentation of the first content.

Block 708 receives second content comprising encrypted content 124. The encrypted content 124 may be based at least in part on the piece of content, or may be the content itself. In some implementations the second content may be provided at a higher resolution than the first content. For example, the first content may be provided in 480p standard definition while the second content is provided in 1080p high definition. The action of block 708 may be based at least in part on the request in some implementations.

In some implementations, the first content and the second content may be provided by different servers. These servers may be operated or administered by the same or different entities. For example, the first content may be provided by a first server 116(1) operated by a first content provider, while the second content may be provided by a second server 116(2) operated by a second content provider.

Block 710 decrypts the second content. In some implementations where the content is protected using one or more DRM schemes, the decryption of the second content may use the digital rights management client module 110. For example, the DRM client module 110 may decrypt the encrypted content 124. The first content and the second content may be received contemporaneously with one another for a portion of time. For example, the user device 106 may receive two streams simultaneously, one for the unencrypted content 122 and one for the encrypted content 124. Block 712 causes the discontinuation of the presentation of the first content and causes presentation of the decrypted second content. The discontinuation may include ceasing the sending of the first content to the presentation device. Similarly, the decrypted second content may be sent to the presentation device. For example, the content transition module 112 may transition the presentation on the display from the unencrypted content 122 to the encrypted content 124. In some implementations, the discontinuation of the first content may occur substantially simultaneously with the presentation of the second content.

The discontinuation and presentation may be synchronized to occur at a predetermined transition time, such as the transition point 210 described above with respect to FIG. 2, or the transition start 306 and the transition end 308. As also described above, the predetermined transition time may be fixed, or may vary. The predetermined transition time may vary based at least in part upon availability of the decrypted second content such that the predetermined transition time occurs after the decrypted second content is available.

The process associated with the transition is described in more detail next with regard to FIG. 8.

Figure 8:
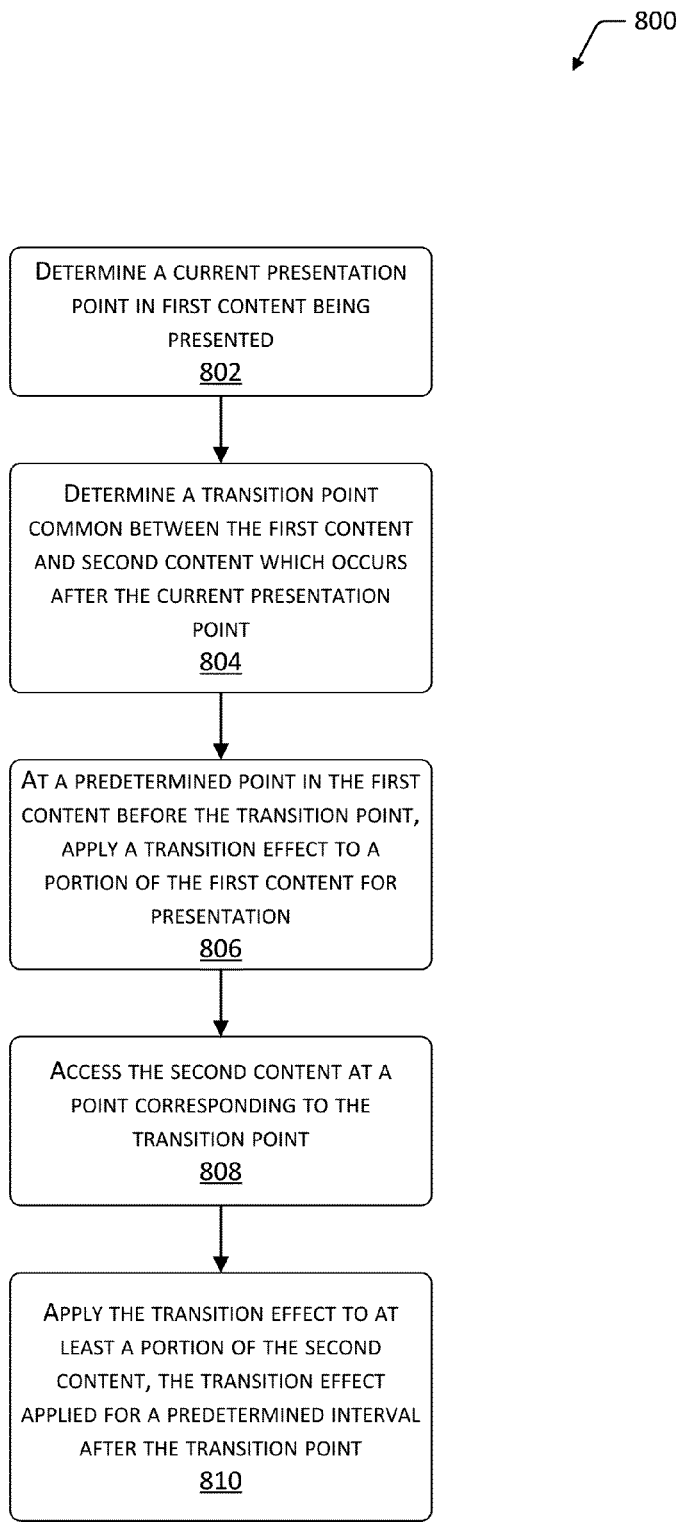
FIG. 8 is a flow diagram of a process of transitioning from unencrypted content to encrypted content during low latency content presentation.

FIG. 8 is a flow diagram 800 of a process of transitioning from the unencrypted content 122 to the encrypted content 124 during low latency content presentation. This process may be implemented by the content transition module 112 of the user device 106.

Block 802 determines a current presentation point in the first content being presented. The current presentation point designates a particular portion of the first content being presented on the display. For example, the current presentation point may indicate that the user device 106 is currently presenting the unencrypted content 122 at time 3.4 seconds. The presentation points or other points within or relative to the content may be based on presentation time, frame number, and so forth.

Block 804 determines the transition point 210 common between the first content and the second content. For example, as described above with regard to FIG. 2, the transition point 210 may be the point at which the encrypted content 124 is available for presentation.

Block 806, at a predetermined point in the first content before the transition point 210, applies the transition effect 418 to the first content before presentation. For example, the content transition module 112 may apply the blur 502 transition effect 418 to the eighteen image frames leading up to the transition point.

In some implementations, the transition effect 418 or another transition effect 418 may be applied to the second content instead of, or in addition to, the first content. Block 808 accesses the second content at a point corresponding to the transition point 210. Block 810 applies, for a predetermined interval after the transition point 210, the same transition effect 418 or another transition effect 418 to the second content before presentation. For example, a reverse of the blur 502 transition effect used for the first content may be used to present the second content going from a blurred state to a non-blurred state.

Figure 9:
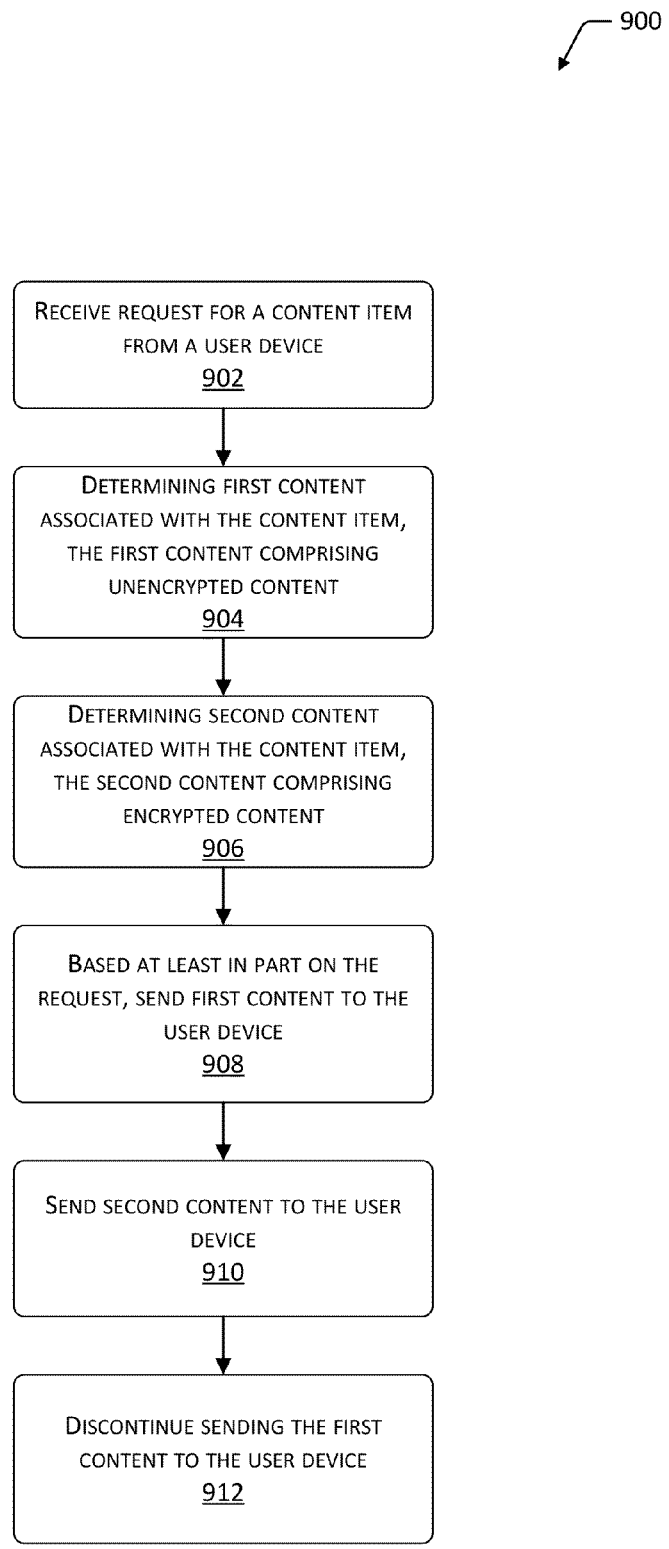
FIG. 9 is a flow diagram of a process of low latency content presentation from the server point of view.

FIG. 9 is a flow diagram 900 of a process of low latency content presentation from the server 116 point of view. This process may be implemented by the content distribution module 118, the DRM server module 120, or both.

Block 902 receives a request for a content item from the user device 106. For example, a request for presentation of the move "Burnt Sage" may be received by the server 116.

Block 904 determines, based at least in part on the request, first content associated with the requested content item. This first content may comprise unencrypted content or content which is encrypted with simpler or minimal encrypted scheme. For example, the user request for the movie "Burnt Sage" may be processed to determine the particular file identifiers associated with the unencrypted content 122.

In some implementations the unencrypted content 122 may be generated by decrypting the encrypted content 124 at the server 116. A predetermined portion of the encrypted content 124 may be decrypted to form the first content, such as the unencrypted content 122. The predetermined portion may be a predetermined time period of the content from a beginning of the content. For example, the DRM server module 120 may decrypt the first ten seconds of the encrypted content 124.

Block 906 determines, based at least in part on the request, second content associated with the requested content item. This second content may comprise encrypted content 124. For example, the user request for the movie "Burnt Sage" may be processed to determine the particular file identifiers associated with the encrypted content 124.

Block 908, based at least in part on the request, sends the first content to the user device 106. As described above, this first content may comprise the unencrypted content 122. Alternatively, the first content may be encrypted using a scheme other than DRM which allows for less time to setup and present compared to the DRM scheme.

Block 910 sends second content to the user device 106. The second content may comprise the encrypted content 124, which is protected using one or more DRM schemes. For example, the server 116 may use the network interface 608 to send the content over the network 114. The first content and the second content may be sent to the same user device 106 contemporaneously with one another. As a result, the user device 106 may receive both streams at the same time for at least some period of time.

In some implementations, the action of block 910 may be based at least in part on the request. For example, the initial request for content may be used to trigger the action of block 908 to send the first content as well as the action of block 910 to send the second content.

In some implementations, the server 116 may apply the one or more transition effects 418 to at least a portion of the first content, the second content, or both, before the sending to the user device 106. For example, the server 116 may modify the stream sent to the user device to impose the blur effect 502 on a portion of the unencrypted content 122 and the encrypted content 124.

Block 912 discontinues the sending of the first content to the user device 106. In some implementations, the discontinuation may be based at least in part on the establishment of the DRM privileges and an acknowledgement from the user device 106 that the encrypted content 124 is ready for presentation.

In some implementations where the second content is encrypted or otherwise protected using one or more digital rights schemes, additional blocks may send or exchange one or more keys associated with the one or more DRM schemes associated with the second content. For example, the user device 106 and the server 116 may exchange information such as hardware identifiers and validation codes to determine the user device 106 is authorized to present the encrypted content 124.

Other implementations may also be used. In one implementation, the server 116 may initiate a single stream to the user device 106, which starts with unencrypted content 122 and transitions to encrypted content 124. In this implementation, the user device 106 and the server 116 may engage in the setup of the environment for presentation of the DRM encrypted content 124 while the unencrypted content 122 is transferred for presentation. Upon acknowledgement from the user device 106, or at a predetermined point, the transferred stream of content may be transitioned from unencrypted to encrypted. As above, the user 102 would thus experience, a seamless transition and may be unaware of the transition.

As described above, the DRM functions and content distribution functions are illustrated on a single server 116, but it is understood that these functions may be distributed across one or more servers, which may be maintained by one or more different entities. For example, the DRM server module 120 may be maintained on a server operated by a content distributor, while the content distribution module 118 is maintained by a content provider.

The content which these techniques may be applied to include still images, video, associated audio of the video, audio-only and so forth. The processes described above may thus be used to improve the user experience while consuming a wide variety of content.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system, comprising:
a network interface configured to couple to a network;
a media device interface configured to couple to a presentation device;
at least one memory storing computer-executable instructions; and
at least one processor configured to couple to the network interface, couple to the media device interface, access the at least one memory, and execute the computer-executable instructions to:
send, to a server using the network interface, a request for streaming of a piece of content;
based at least in part on the request, receive, using the network interface, a first content stream comprising unencrypted content;
cause presentation of the first content stream using the media device interface;
based at least in part on the request, receive, using the network interface, a second content stream comprising encrypted content, wherein the first content stream and the second content stream are associated with a same content item;
decrypt the received second content stream;
cause the presentation of the first content stream to be discontinued;
cause presentation of the second content stream using the media device interface; and
apply a transition effect to one or more images of at least a portion of one or more of the first content stream or at least a portion of the second content stream before presentation.

2. The system of claim 1, wherein the first content stream has a total length less than that of the second content stream.

3. The system of claim 1, wherein the processor is further configured to execute instructions to receive one or more digital rights management keys, wherein the decrypting comprises decrypting the second content stream using the one or more digital rights management keys.

4. The system of claim 1, wherein the discontinuation of the first content stream occurs substantially simultaneously with the presentation of the second content stream.

5. The system of claim 1, wherein the presentation of the second content stream is synchronized with the presentation of the first content stream.

6. A computer-implemented method for utilizing processing resources of a computerized system, the computer-implemented method comprising:
  sending, to a server, a request for streaming a piece of content, the request including information specifying the piece of content;
  based at least in part on the request, receiving first content comprising unencrypted content, wherein the unencrypted content is based, at least in part, on the piece of content;
  sending the first content to a presentation device;
  receiving second content comprising encrypted content, wherein the encrypted content is based, at least in part, on the piece of content;
  decrypting the second content;
  applying one or more transition effects to one or more images of at least a portion of one or more of the first content or the decrypted second content; and
  discontinuing the sending of the first content and sending the decrypted second content to the presentation device.

7. The method of claim 6, wherein the receiving the first content and the receiving the second content are contemporaneous with one another for a portion of time.

8. The method of claim 6, further comprising:
  synchronizing the discontinuation of the first content and the presentation of the second content to occur at a transition time.

9. The method of claim 8, wherein the transition time is fixed.

10. The method of claim 8, wherein the transition time varies based at least in part upon availability of the decrypted second content such that the transition time occurs after the decrypted second content is available.

11. The method of claim 6, wherein the causing the discontinuation of the presentation of the first content further comprises:
  determining a presentation point in the first content being presented, wherein the presentation point designates a particular portion of the first content being presented;
  determining a transition point common between the first content and the second content; and
  at a predetermined point in the first content before the transition point, applying the transition effect to the first content before presentation.

12. The method of claim 11, wherein the causing the discontinuation of the presentation of the first content further comprises:
  accessing the second content at a point corresponding to the transition point; and
  applying, for a predetermined interval after the transition point, the transition effect to the second content before presentation.

13. The method of claim 6, wherein the causing the discontinuation of presentation of the first content further comprises:
  accessing the second content at a point corresponding to a transition point, wherein the transition point comprises a point within the second content at which the presentation of the second content occurs; and
  applying the transition effect to at least a predetermined portion of the second content before presentation.

14. The method of claim 13, wherein the predetermined portion comprises a predetermined interval starting at the transition point.

15. The method of claim 6, wherein the causing the presentation of the second content further comprises:
  determining a presentation point in the first content being presented, wherein the presentation point designates a particular portion of the first content being presented;
  determining a transition point common between the first content and the second content; and
  at a predetermined point in the first content before the transition point, applying the transition effect to the first content before presentation.

16. The method of claim 11, wherein the causing the presentation of the second content further comprises:
  accessing the second content at a point corresponding to the transition point; and
  applying, for a predetermined interval after the transition point, the transition effect to the second content before presentation.

17. The method of claim 6, wherein the causing the presentation of the second content further comprises:
  accessing the second content at a point corresponding to a transition point, wherein the transition point comprises a point within the second content at which the presentation of the second content occurs; and
  applying the transition effect to at least a predetermined portion of the second content before presentation.

18. A computer-implemented method for utilizing processing resources of a computerized system, the computer-implemented method comprising:
  receiving, from a user device, a request for a content item;
  determining first content associated with the content item, the first content comprising unencrypted content;
  determining second content associated with the content item, the second content comprising encrypted content;
  based at least in part on the request, sending the first content to the user device;
  based at least in part on the request, sending the second content to the user device;
  applying with a hardware processor a transition effect to at least a portion of one or more images of one or more of the first content or the second content; and
  discontinuing the sending the first content to the user device.

19. The method of claim 18, wherein the sending the first content to the user device and the sending the second content to the user device are contemporaneous with one another.

20. The method of claim 18, wherein the transition effect is applied to at least a portion of the first content before the sending of the first content to the user device.

21. The method of claim 18, further comprising:
  decrypting a portion of the second content to form the first content before the sending of the first content to the user device.

22. The method of claim 21, wherein the portion comprises a piece of the second content associated with a time period beginning at a start of the second content.

23. The method of claim 18, further comprising sending or exchanging one or more keys associated with one or more digital rights management schemes associated with the second content.

24. The method of claim 18, wherein the content comprises video and associated audio.

\* \* \* \* \*

UNITED STATES PATENT AND TRADEMARK OFFICE
CERTIFICATE OF CORRECTION

| | | |
|---|---|---|
| PATENT NO. | : 9,088,550 B1 | Page 1 of 1 |
| APPLICATION NO. | : 13/685252 | |
| DATED | : July 21, 2015 | |
| INVENTOR(S) | : Quais Taraki et al. | |

It is certified that error appears in the above-identified patent and that said Letters Patent is hereby corrected as shown below:

On the title page, item (54) and in the specification, column 1, line 1, in the title:

"LOVE" should be --LOW--

Signed and Sealed this
Fifth Day of January, 2016

Michelle K. Lee
*Director of the United States Patent and Trademark Office*